United States Patent
Ramos Salas et al.

(10) Patent No.: US 10,620,628 B2
(45) Date of Patent: Apr. 14, 2020

(54) CONTROL STATION FOR UNMANNED AIR VEHICLES AND WORKING PROCEDURE

(71) Applicant: Airbus Defence and Space S.A., Getafe (ES)

(72) Inventors: Francisco Javier Ramos Salas, Getafe (ES); César Castro Gómez, Getafe (ES); Aníbal Fernández Vázquez, Getafe (ES)

(73) Assignee: AIRBUS DEFENCE AND SPACE S.A., Getafe (ES)

( * ) Notice: Subject to any disclaimer, the term of this patent is extended or adjusted under 35 U.S.C. 154(b) by 47 days.

(21) Appl. No.: 15/823,833

(22) Filed: Nov. 28, 2017

(65) Prior Publication Data

US 2018/0150075 A1 May 31, 2018

(30) Foreign Application Priority Data

Nov. 29, 2016 (EP) .................................... 16382570

(51) Int. Cl.
*G06F 11/00* (2006.01)
*G05D 1/00* (2006.01)
(Continued)

(52) U.S. Cl.
CPC ......... *G05D 1/0077* (2013.01); *B64C 39/024* (2013.01); *G05D 1/0016* (2013.01);
(Continued)

(58) Field of Classification Search
CPC .. G05D 1/0077; G05D 1/0011; G05D 1/0022; G05D 1/0033; H04W 36/18
See application file for complete search history.

(56) References Cited

U.S. PATENT DOCUMENTS 8,016,243 B2 * 9/2011 Beaufrere ............ G05D 1/0077
244/194
8,275,494 B1 * 9/2012 Roth ................. H04L 12/40013
244/75.1
(Continued)

FOREIGN PATENT DOCUMENTS

WO 2015140795 9/2015

OTHER PUBLICATIONS

European Search Report, dated May 22, 2017, priority document.

*Primary Examiner* — Bryce P Bonzo
*Assistant Examiner* — Jeison C Arcos
(74) *Attorney, Agent, or Firm* — Greer, Burns & Crain, Ltd.

(57) ABSTRACT

An Unmanned Air Vehicle control station, comprising critical systems implementing safety involved functions, non-critical systems implementing non-safety involved functions and a gateway computer. The critical systems comprise at least two redundant critical computers, a redundant critical network and critical back-up network, and at least two redundant UAV-specific computers that implement UAV-specific functions and communicate with the UAV, wherein the at least two critical computers and the at least two UAV-specific computers are connected to the critical network and to the critical back-up network. The non-critical systems comprise at least one non-critical computer, and a non-critical network, wherein the at least one non-critical computer is connected to the non-critical network. The gateway computer centralizes and supervises data exchanges between the critical and non-critical systems, such that the control station comprises a plurality of redundant operator consoles, each operator console comprising at least two redundant critical computers and a non-critical computer.

3 Claims, 1 Drawing Sheet

(51) Int. Cl.
  *G08G 5/00* (2006.01)
  *H04B 7/185* (2006.01)
  *H04W 84/06* (2009.01)
  *B64C 39/02* (2006.01)
  *G06F 11/20* (2006.01)

(52) U.S. Cl.
  CPC ....... *G06F 11/2033* (2013.01); *G08G 5/0013* (2013.01); *G08G 5/0026* (2013.01); *G08G 5/0069* (2013.01); *H04B 7/18504* (2013.01); *H04W 84/06* (2013.01)

(56) References Cited

U.S. PATENT DOCUMENTS

| | | | |
|---|---|---|---|
| 2002/0112051 A1* | 8/2002 | Ullman | H04L 41/0816 709/224 |
| 2009/0248759 A1* | 10/2009 | Okada | G06F 11/1456 |
| 2010/0025544 A1* | 2/2010 | Beaufrere | B64D 31/00 244/76 R |
| 2011/0245996 A1 | 10/2011 | Orsulak et al. | |
| 2015/0274293 A1* | 10/2015 | Heusinger | B64C 15/00 701/36 |
| 2015/0346722 A1* | 12/2015 | Herz | G05D 1/0038 701/2 |
| 2016/0070261 A1 | 3/2016 | Heilman et al. | |
| 2016/0253908 A1 | 9/2016 | Chambers et al. | |
| 2016/0351057 A1* | 12/2016 | Elmasry | G05D 1/0022 |
| 2018/0004201 A1* | 1/2018 | Zach | G05D 1/0022 |

* cited by examiner

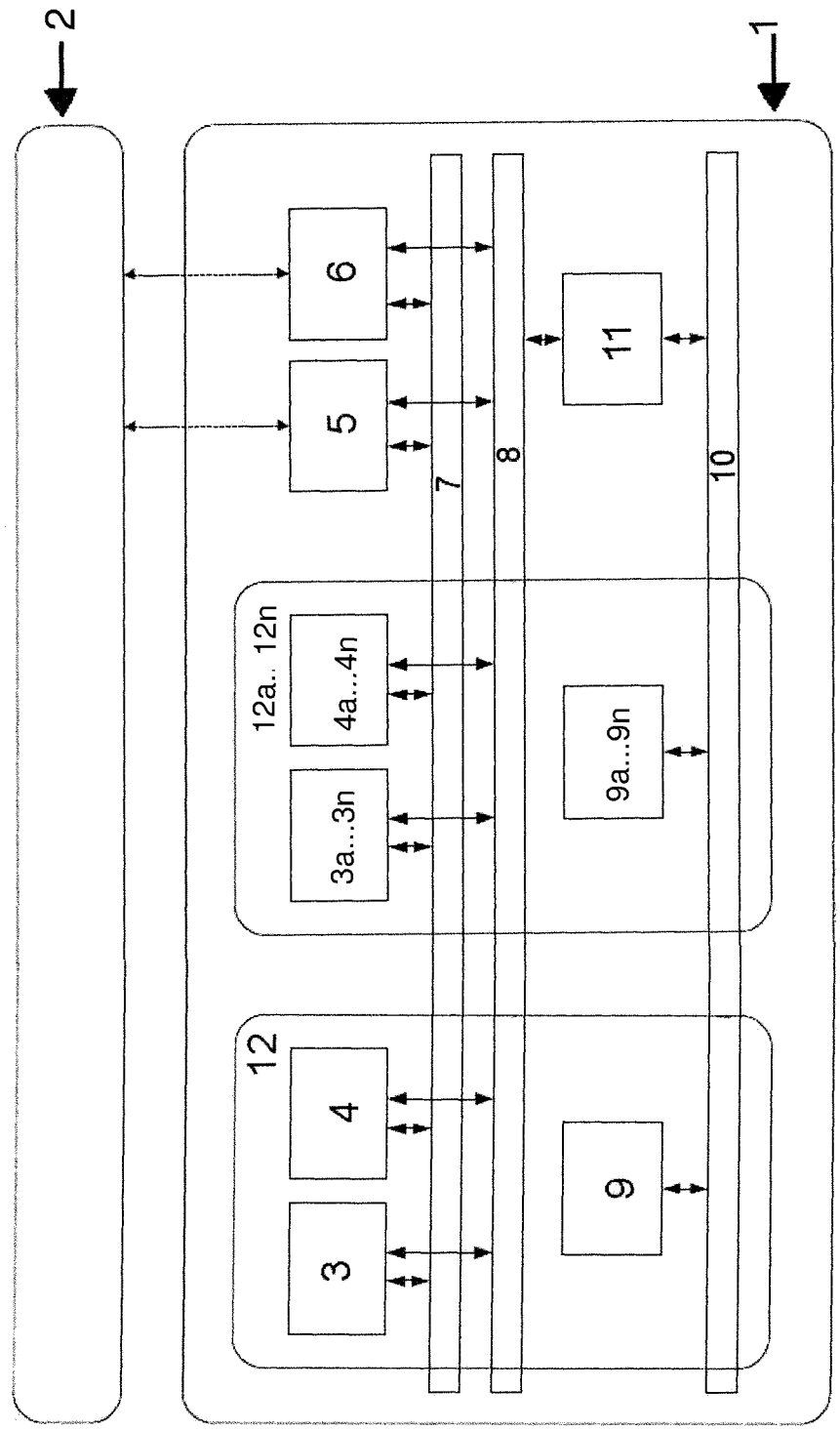

CONTROL STATION FOR UNMANNED AIR VEHICLES AND WORKING PROCEDURE

CROSS-REFERENCES TO RELATED APPLICATIONS

This application claims the benefit of the European patent application No. 16382570.6 filed on Nov. 29, 2016, the entire disclosures of which are incorporated herein by way of reference.

FIELD OF THE INVENTION

The present invention relates to a control station for Unmanned Air Vehicles (UAV) and to an associated working procedure.

The invention belongs to the field of Unmanned Aircraft Systems (UAS), and, more specifically, to the field of UAV control stations.

It is especially applicable to medium to large UAV (with a maximum take-off weight greater than 150 kg), which are intended to fly in non-segregated airspace with other traffic, and, therefore, are subject to the strict safety standards used in the aerospace industry.

BACKGROUND OF THE INVENTION

The use of Unmanned Aircraft Systems (UAS) is more and more demanded by civil and military applications, and the integration of such systems into non-segregated airspace is becoming a must. However, nowadays existing UAS are not allowed to operate in non-segregated airspace, as they are not designed in accordance with the demanding airworthiness standards which apply for manned aviation.

Regulations for integration of UAS into the airspace are still in development, but most of them refer to aerospace safety standards like SAE ARP 4761 (Aerospace Recommended Practice—Guidelines and Methods for Conducting the Safety Assessment Process on Civil Airborne Systems and Equipment) or SAE ARP 4754 (Aerospace Recommended Practice—Guidelines for Development of Civil Aircraft and Systems) as applicable airworthiness requirements.

Traditionally the focus on compliance with these standards has been on the airborne part of the system, paying little attention to them in the control station design. As a consequence, the existing control station architectures are not designed to cope with these standards and most of them cannot fulfil the required levels of safety.

Accordingly, some prior art documents are focused on controlling the UAV, and do not include concepts relating to the safety standards for UAS.

US20160070261 A1 discloses an automated flight control system for an unmanned aerial vehicle (UAV), comprising a flight computer for managing functions related to a flight of the UAV, an application processor for managing functions on the UAV not related to flight, a flight data recorder to record data related to a flight of the UAV, an attitude and heading reference system, a global navigation satellite system receiver, a self-separation module for communicating with another aircraft for the purpose of avoiding a collision, and a wireless communications module for communicating with the remote system, wherein the automated flight control system is capable of receiving operational instructions via the wireless communications module from the remote system.

US20160253908 A1 discloses an Unmanned Aerial System configured to receive a request from a user and fulfill that request using an Unmanned Aerial Vehicle. The Unmanned Aerial System selects a distribution center that is within range of the user, and deploys a suitable Unmanned Aerial Vehicle to fulfill the request from that distribution center. The Unmanned Aerial System is configured to provide real-time information about the flight route to the Unmanned Aerial Vehicle during its flight, and the Unmanned Aerial Vehicle is configured to dynamically update its mission based on information received from the Unmanned Aerial System.

In addition to the safety aspects, another market demand for UAS is to develop generic control stations that can be used to control different types of UAVs, which provide significant operational benefits as reduced acquisition and maintenance costs or simplified training. Although several interoperability standards are currently available, the existing interoperable control station designs do not take into account compliance with the mentioned safety regulations.

SUMMARY OF THE INVENTION

Therefore, an object of the invention is to provide a control station for Unmanned Air Vehicles which complies with safety regulations and interoperability needs.

The invention provides a control station for Unmanned Air Vehicles, comprising critical systems which implement safety involved functions, non-critical systems which implement non-safety involved functions and a gateway computer, wherein
the critical systems comprise:
at least two redundant critical computers,
a critical network,
a critical back-up network, the critical network and the critical back-up network being redundant, and
at least two redundant UAV-specific computers that implement UAV-specific functions and are in communication with the Unmanned Air Vehicle,
such that the at least two redundant critical computers and the at least two redundant UAV-specific computers are connected to the critical network and to the critical back-up network,
the non-critical systems comprise:
at least one non-critical computer, and
a non-critical network,
such that the at least one non-critical computer is connected to the non-critical network, and
the gateway computer centralizes and supervises the data exchanges between the critical systems and the non-critical systems,
in such a way that the control station comprises a plurality of redundant operator consoles, each operator console comprising at least two redundant critical computers and a non-critical computer.

The invention also provides a working procedure for a Control station for Unmanned Air Vehicles, wherein:
the Unmanned Air Vehicles are controlled by the redundant critical computers and the non-critical computers in the operator consoles of the control station,
the redundant critical computers cross check each other during operation such that if one of them fails, the operator console comprising the redundant critical computers is declared as faulty and their functions are transferred to another operator console, the redundant UAV-specific computers cross check each other during operation such that if one of them fails, the other UAV-specific computer takes control of its functions, and the redundant critical computers and the redundant UAV-specific computers send messages through both the critical network and the critical back-up network, and listen to incoming messages from both the critical network and the critical back-up network.

The configuration of the control station for Unmanned Air Vehicles of the invention allows the use of segregation and redundancy to address the above-indicated problems. In effect, with this configuration:

Safety involved and non-safety involved functions are segregated. This allows:
  to ensure that critical systems are protected from non-critical systems malfunctions, and
  to concentrate the additional development effort required for safety involved functions in the actual critical parts of the system.

Generic and UAV-specific functions are segregated to maximize reuse and confine adaptations and modifications required to integrate a new UAV type.

Critical systems are redundant to ensure a fail-safe design. This redundancy protects the UAS operation from the following failure conditions:
  generation of unintended commands,
  display of wrong or misleading information to the operator(s), or
  loss of UAV control capability.

Another advantage of the invention is that it avoids a single point of failure for safety involved functions, being "safety involved functions" the ones directly related with UAV command and control.

Other advantageous embodiments will be described in the dependent claims.

BRIEF DESCRIPTION OF THE DRAWINGS

For a more complete understanding of the present invention, it will be described below in greater detail, making reference to the attached drawing, in which:

The FIGURE is a diagram showing the overall architecture of the control station for Unmanned Air Vehicles of the invention and an Unmanned Air Vehicle.

DETAILED DESCRIPTION OF THE PREFERRED EMBODIMENTS

The FIGURE shows the overall architecture of the control station 1 for Unmanned Air Vehicles 2 of the invention and an Unmanned Air Vehicle 2 controlled by such control station 1.

The control station 1 comprises critical systems which implement safety involved functions, non-critical systems which implement non-safety involved functions and a gateway computer 11.

For the purpose of the invention, "safety involved functions" are the ones directly related with UAV command and control, and "non-safety involved functions" are the rest of the functions.

The critical systems, which implement the safety involved functions, comprise: critical computers 3, 4 (at least one pair of critical computers 3, 4 per operator console 12), critical network 7, critical back-up network 8, and UAV-specific computers 5, 6.

The non-critical systems, which implement the non-safety involved functions, comprise: non-critical computers 9 (at least one per operator console 12) and non-critical network 10.

The gateway computer 11 centralizes and supervises all data exchanges between critical and non-critical systems. This ensures that a failure in the non-critical network 10 cannot be propagated to the critical networks 7, 8.

The UAV-specific functions are implemented by the UAV-specific computers 5, 6. All the communications with the UAV 2 are routed through the UAV-specific computers 5, 6. The rest of the elements are considered part of the generic systems.

The number of operator consoles 12 is configurable. Different control station deployments can have a different number of operator consoles 12 depending on the specific needs. UAV controls and displays are controlled by the computers 3, 4, 9 in the operator consoles 12.

The critical computers 3, 4 cross check each other to ensure that a failure in one of them cannot generate a safety issue. If one of these critical computers 3, 4 fails, the complete operator console 12 is declared as faulty and its functions are transferred to another operator console 12.

The UAV-specific computers 5, 6 also cross check each other. If one of them fails, the other takes control of its functions.

The critical network 7 and the critical back-up network 8 are also redundant to avoid a situation wherein a single failure ends in a loss of UAV control. The critical computers 3, 4 and UAV-specific computers 5, 6 are connected to both networks (i.e., to the critical network 7 and to the critical back-up network 8). They send all their messages twice though both networks and listen to incoming messages from both of them. Only one copy of the incoming messages is required to perform the corresponding function, therefore the system will behave correctly with just one of the critical networks 7, 8 working.

According to one embodiment of the invention, there are two operator consoles 12 in the control station 1, each one of them with two redundant critical computers 3, 4 and one non-critical computer 9.

Although the present invention has been fully described in connection with preferred embodiments, it is evident that modifications may be introduced within the scope thereof, not considering this as limited by these embodiments, but by the contents of the following claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A control station for Unmanned Air Vehicles, comprising:
  critical systems which implement safety involved functions, non-critical systems which implement non-safety involved functions, and a gateway computer:
the critical systems comprising:
at least two redundant critical computers,
a critical network,
a critical back-up network, the critical network and the critical back-up network being redundant, and
at least two redundant UAV-specific computers that implement UAV-specific functions and are in communication with the Unmanned Air Vehicle,
wherein the at least two redundant critical computers and the at least two redundant UAV-specific computers are connected to the critical network and to the critical back-up network,
the non-critical systems comprise:
at least one non-critical computer, and
a non-critical network,
wherein the at least one non-critical computer is connected to the non-critical network, and
the gateway computer is configured to centralize and supervise the data exchanges between the critical systems and the non-critical systems,
wherein the control station comprises a plurality of redundant individual operator consoles, each individual operator console comprising the at least two redundant critical computers and a non-critical computer.

2. The control station for Unmanned Air Vehicles, according to claim 1, comprising two operator consoles, each one of them with two redundant critical computers and one non-critical computer.

3. A working procedure for a control station for Unmanned Air Vehicles of claim 1, comprising the steps:
controlling the Unmanned Air Vehicles by the redundant critical computers and the non-critical computers in the operator consoles of the control station,
cross checking each other by the redundant critical computers during operation such that if one of them fails, the operator console comprising the redundant critical computers is declared as faulty and their functions are transferred to another operator console,
cross checking each other by the redundant UAV-specific computers during operation such that if one of them fails, the other UAV-specific computer takes control of its functions, and
sending messages by the redundant critical computers and the redundant UAV-specific computers through both the critical network and the critical back-up network, and listening to incoming messages from both the critical network and the critical back-up network.

* * * * *